United States Patent
Buller (10) Patent No.: US 6,805,311 B2
(45) Date of Patent: Oct. 19, 2004

(54) TRACK DRIVE FOR A MOBILE IRRIGATION SYSTEM

(76) Inventor: Myron Buller, HC 59 Box 156A, Atkinson, NE (US) 68713

( * ) Notice: Subject to any disclaimer, the term of this patent is extended or adjusted under 35 U.S.C. 154(b) by 322 days.

(21) Appl. No.: 10/080,392

(22) Filed: Feb. 25, 2002

(65) Prior Publication Data

US 2002/0125350 A1 Sep. 12, 2002

Related U.S. Application Data

(60) Provisional application No. 60/274,660, filed on Mar. 12, 2001.

(51) Int. Cl.$^7$ ................................................ B05B 3/18
(52) U.S. Cl. .................... 239/722; 239/752; 239/750; 305/199; 305/165; 305/169; 180/9.1
(58) Field of Search ................................. 239/750, 737, 239/735, 722, 738, 739, 736, 723, 752, 264, 728, 731, 733; 305/124, 126, 135, 136, 165, 169, 193, 195, 199; 180/9.1

(56) References Cited

U.S. PATENT DOCUMENTS

| | | | | |
|---|---|---|---|---|
| 916,601 A | * | 3/1909 | Robert et al. ............... | 305/124 |
| 1,482,726 A | * | 2/1924 | Best ........................... | 180/9.54 |
| 1,541,026 A | | 6/1925 | Blewett ...................... | 305/199 |
| 1,613,598 A | | 1/1927 | Armstrong .................. | 474/156 |
| 1,966,783 A | | 7/1934 | Balaam ....................... | 239/737 |
| 2,711,615 A | | 6/1955 | Boice .......................... | 239/729 |
| 2,931,579 A | | 4/1960 | Ruddell ....................... | 239/736 |
| 3,342,417 A | * | 9/1967 | Dowd .......................... | 239/731 |
| 3,653,400 A | * | 4/1972 | Coates ......................... | 239/731 |
| 3,712,544 A | * | 1/1973 | Ririe et al. .................. | 239/731 |
| 3,780,947 A | * | 12/1973 | Ririe et al. .................. | 239/731 |
| 4,140,197 A | * | 2/1979 | Joyce .......................... | 180/347 |
| 4,365,748 A | | 12/1982 | Emrich ....................... | 239/728 |
| 4,452,394 A | | 6/1984 | Emrich ....................... | 239/728 |
| 5,078,326 A | | 1/1992 | Wright ........................ | 239/737 |
| 5,240,084 A | * | 8/1993 | Christianson ............... | 180/9.21 |
| 6,131,833 A | | 10/2000 | Chapman ..................... | 239/728 |
| 2002/0179343 A1 | * | 12/2002 | Theilen ........................ | 180/9.21 |

FOREIGN PATENT DOCUMENTS

| | | |
|---|---|---|
| AU | 227737 | 8/1959 |
| AU | 291021 | 7/1967 |
| AU | 293781 | 7/1967 |

* cited by examiner

Primary Examiner—Patrick Brinson
(74) Attorney, Agent, or Firm—Richard C. Litman (57) ABSTRACT

A track drive system for a mobile irrigation system adapts to either centrally pivoted circular or linear mobile systems, as desired. A first embodiment has a single drive wheel with opposed first and second end guide wheels, surrounded by a single narrow track. A single drive motor and gear reduction drive, drives the central wheel. The central wheel is of considerably larger diameter than the two end guide wheels, and simultaneously contacts the track with both its upper and lower peripheries at all times. The mechanism is articulated to allow independent wheel movement relative to one another, thus providing better traction over uneven surfaces. The central drive wheel is always in contact with both the upper and lower track portion to provide continuous drive traction for the device. A second embodiment includes additional idler wheels between the two end wheels and the central drive wheel.

18 Claims, 6 Drawing Sheets

TRACK DRIVE FOR A MOBILE IRRIGATION SYSTEM

CROSS-REFERENCE TO RELATED APPLICATION

This application claims the benefit of U.S. Provisional Patent Application Ser. No. 60/274,660, filed Mar. 12, 2001.

BACKGROUND OF THE INVENTION

1. Field of the Invention

The present invention relates generally to the agricultural field, and more specifically to mobile irrigation systems in which a suspended irrigation pipe is carried over a field in a circular or lateral linear path to irrigate the underlying crops. The present invention is a track driven support tower for such suspended irrigation pipes or lines, which reduces crop damage by means of its narrow track and width and further reduces field damage by means of the large area of the elongate track which spreads the load of the tower and pipe over a larger surface area.

2. Description of Related Art

The development of mobile irrigation systems has opened up large areas of land which would otherwise be too arid for growing certain crops which require larger amounts of water. These systems comprise a relatively long irrigation pipe or line suspended over the crops by a series of mobile towers, which carry the line in a linear or circular path to irrigate the underlying crops.

While such irrigation systems have provided great benefit to large farming operations by allowing them to grow more profitable crops and/or to produce greater yields per acre, such systems are not without their drawbacks. Most conventional mobile irrigation systems use two or more wheels and tires to support the pipe tower(s), rather than a track system as in the present invention. While such wheeled systems function adequately to provide motion for the tower and to carry the overlying irrigation pipe or line, the considerable weight of the overlying irrigation pipe and the water therein (which may comprise a run of over one hundred feet) results in a considerable load on the wheels and tires of the support tower(s). This often results in the wheels and tires forming deep ruts in the underlying surface, particularly when that surface has been softened by irrigation.

These ruts and tracks then interfere with other machinery (harvesters, etc.) operated in the field subsequent to the irrigation operations. In some cases, the tracks and ruts produced by the irrigation equipment can be so large or deep that other types of equipment are damaged by repeated use over such areas. Moreover, the production of such ruts and tracks leads to water collection in the ruts and uneven irrigation of the crops in the fields, as well as wasted water which collects within the ruts. Such deep ruts and tracks have also been known to cause the wheels of the irrigation towers to become stuck during later passage through the same area or track, particularly if the track has been filled with water and the ground is excessively soft as a result.

Another problem with conventional wheeled mobile irrigation towers is crop damage due to the relatively wide wheel and tire necessary to support the heavy weight of the overlying irrigation pipe and support tower. For example, a pipe having an internal diameter of only six inches and a span of one hundred feet would carry on the order of 150 gallons of water weighing about 1200 pounds. When the weight of the pipe, its support structure, the support towers, and mobile structure (wheels, propulsion motor(s), etc.) are added to the weight of the water, it will be seen that each tower must support a considerable load. Hence, most such towers utilize relatively large diameter and wide tires in an attempt to distribute the load over a relatively wide area. This results in a relatively large percentage of the crop being knocked down or damaged, due to the passage of the wide wheel, tire, and other tower structure thereover.

While track driven mobile irrigation systems have been developed in the past in an attempt to overcome at least the problem of the system becoming mired in its own ruts or tracks, as well as to spread the weight of the apparatus over a relatively large area, such prior art systems do nothing to provide the narrowest possible track width in order to reduce damage to crops to the greatest possible extent. While it may seem obvious to reduce the width of the tower structure which passes through the crops, this has not been accomplished to the maximum possible degree in any of the devices of the prior art of which the present inventor is aware.

Accordingly, a need will be seen for a track drive for a mobile irrigation system which provides a relatively narrow track and drive system width in order to reduce damage to crops to the greatest extent possible, but which track is relatively long in order to provide the greatest practicable contact area for the track and hence the lowest possible unit pressure for the overlying structure. The present track drive accomplishes this by means of a single, central drive wheel and a pair of outlying support wheels disposed to each end of the track length to provide a relatively long track span or length. Intermediate track support may be provided by additional idler wheels between the central drive wheel and outlying support wheels, if so desired. The single drive wheel precludes need for drive shafts extending alongside the device to provide motive force for plural wheels, thus reducing the overall width of the assembly. The drive wheel is also dished to provide an interior volume which houses the drive motor and gearbox for the assembly, again greatly reducing the overall width of the assembly.

The present track drive system also includes an independent suspension system for the central drive wheel and outlying wheels, allowing the device to traverse uneven ground while still maintaining maximum contact with the underlying surface to spread the system load and maintain traction. The single, larger diameter central drive wheel is in contact with both the upper and lower track segment at all times, in order to produce continuous drive force to the track.

A discussion of the related art of which the present inventor is aware, and its differences and distinctions from the present invention, are discussed below.

U.S. Pat. No. 1,541,026 issued on Jun. 9, 1925 to Arthur R. Blewett, titled "Tractor Machine," describes an endless track and wheel assembly having a single, central sprocketed drive wheel with forward and rearward non-driven wheels. The central drive wheel contacts the track tangent to both its lowermost and uppermost portions of its rim, thus simultaneously driving the track from both its lower and upper peripheries. However, the Blewett track and wheel assembly differs from the present track drive system in several respects. First, it is noted that all three wheels are linked together by a common structure, thus preventing any relative motion between wheels for traversing uneven surfaces more smoothly. Second, the track is considerably wider than the wheels, as would be necessary to spread the load over a relatively large area in view of the short length of the assembly (all three wheels are spaced apart by only a small fraction of their diameters). It is also noted that Blewett does not provide any means of supporting an overlying structure with his track and wheel assembly.

U.S. Pat. No. 1,613,598 issued on Jan. 11, 1927 to Edward R. Armstrong, titled "Traction Appliance For Automobiles," describes an assembly adapted for installation on an automobile or the like. The assembly includes a specially modified wheel with a solid tire having a series of transverse slots, with a rigid frame including a pair of opposed track end wheels and a track passing around the end wheels and central main wheel. The track engages the transverse slots of the main wheel to drive the vehicle. The structure is thus generally like the structure of the Blewett '026 U.S. patent discussed immediately above, with the rigid structure failing to provide relative articulation between the wheels to better accommodate surface irregularities. As in the Blewett '026 apparatus, Armstrong makes no provision for supporting any overlying structure, as the sole attachment to the vehicle is by means of the drive axle to which the wheel is attached.

U.S. Pat. No. 1,966,783 issued on Jul. 17, 1934 to Maurice A. Balaam, titled "Portable Overhead Irrigation Plant," describes an automatically propelled mobile irrigation device having a track drive in at least one embodiment. The Balaam device differs from the present invention in several respects. First, the track of the track drive embodiment is considerably wider than the present relatively long and narrow track, as is clearly shown in FIG. 5 of the Balaam U.S. patent. This would result in considerably more crop damage along the path of the Balaam device than would occur with the present invention, which when considering that the track path extends at least completely across the field for lateral irrigation systems, and much longer for circular systems, results in considerable crop damage by the Balaam device. Secondly, the Balaam tracked device has a central water powered motor driving forwardly and rearwardly disposed drive wheels. As in the other devices discussed above, the Balaam device also uses a rigid frame which does not provide any relative articulation between wheels.

U.S. Pat. No. 2,711,615 issued on Jun. 28, 1955 to Nelson R. Boice, Jr., titled "Apparatus For Processing Surface Areas," describes a mobile irrigation system with the pipe supported by a series of track drive devices. The Boice, Jr. drive apparatus is more closely related to that of the Balaam '783 U.S. patent discussed immediately above than to the present invention, in that Boice, Jr. provides a single forwardly disposed drive wheel driven by a centrally located motor. A series of idler or bogie wheels is positioned between the forward rearward wheels in the track assembly. All wheels of the Boice, Jr. assembly are installed on a rigid framework which does not allow articulation of the wheels, as does the independent suspension system of the present machine.

U.S. Pat. No. 2,931,579 issued on Apr. 5, 1960 to Clarence W. Ruddell, titled "Automatic Irrigation System," describes a linear mobile irrigation system having a track drive device and a series of non-driven tracked supports disposed along the length of the pipe. The track drive assembly comprises two widely spaced narrow tracks extending laterally from a single carriage which supports the irrigation pipe. The relatively wide carriage is so low that it would damage almost any crop over which it passed, thus causing significant crop damage. The drive system comprises an offset motor which drives an upper intermediate wheel, with the track passing around the intermediate wheel and the two track wheels to drive all of the wheels. As in the case of other devices discussed above, the Ruddell device also has a rigid frame precluding articulation and independent movement of the wheels.

U.S. Pat. No. 4,365,748 issued on Dec. 28, 1982 to Robert R. Emrich, titled "Self-Driven Mobile Center Pivot Irrigation System," describes a system having a mobile tractor device for transporting the system and for serving as the central pivot of the system for its operation. One or more radially outlying propulsion devices are also provided, which more closely relate to the present invention. However, the outlying propulsion devices still differ considerably from the present track drive system in that they have two wheels, each of which is driven by a separate independent belt which wraps about the circumference of its respective wheel. The two belts are in turn driven by a single central gearbox powered by a water driven motor. The motor and gear reduction are offset considerably from the plane of the wheels, unlike the present system. Also, while each wheel has a separate brace structure, the two braces are rigidly secured together during operation to preclude relative wheel movement.

U.S. Pat. No. 4,452,394 issued on Jun. 5, 1984 to Robert R. Emrich, titled "Self Propelled Irrigation Systems," describes various embodiments of such a system. One embodiment comprises a pair of wheels driven by a common belt and drive motor positioned between the wheels. This device is more closely related to the device of the '748 U.S. patent to the same inventor discussed immediately above, than to the present invention. The two wheels of the Emrich '394 device are rigidly affixed relative to one another by the frame structure, unlike the present track drive system with its articulated independent suspension for the wheels.

U.S. Pat. No. 5,078,326 issued on Jan. 7, 1992 to Hubbart L. Wright, titled "Mobile Irrigation Equipment Belt Traction Apparatus," describes a system having a series of four wheels, with a single belt extending therearound. At least one of the front and rear wheels is driven by a motor at the hub thereof. The motor(s) and support structure for the tower supported above the wheels, is laterally offset from the plane of the wheels, rather than having the wheels located symmetrically beneath the tower structure as in the present invention. The asymmetric relationship between the wheels and tower, place a significant bending load upon the wheel axles and lower tower components, requiring a significantly heavier structure than that of the present invention. Moreover, the entire wheel support frame of the Wright apparatus is a single rigid structure, with no relative movement of the wheels permitted. While Wright clearly recognizes the problems associated with wheeled mobile irrigation systems, as indicated in his discussion in the Background of the Invention of his U.S. patent, his invention falls short of the solution provided by the present invention.

U.S. Pat. No. 6,131,833 issued on Oct. 17, 2000 to John A. Chapman, titled "Tracked Drive Tower For A Self-Propelled Irrigation System," describes a track drive system having a single forwardly disposed drive wheel and a series of trailing bogie or idler wheels within the track run, with each pair of idler wheels mounted to a beam which is in turn pivotally attached to a single, rigid overlying structure. The only articulation provided is by means of each pair of idler wheels rocking about its common attachment shaft. Chapman does not provide any spring suspension means, nor adjustment means for such a suspension, in his apparatus. Moreover, no central drive wheel is provided, as is the case of the present invention. It is also noted that the drive motor and gear reduction drive are disposed well outside the plane of the wheels and track, unlike the present invention. Such an installation results in an even wider path for the track assembly as it traverses a field, with the motor and gear reduction damaging additional crops due to their relatively low placement and axial extension from the plane of the wheel and track.

Australian Patent Publication No. 227,737 published on Aug. 27, 1959 to Machinery Specialties Pty. Limited, titled "Mobile Irrigation Sprayer," describes an apparatus having a series of drive towers disposed along a length of pipe. Each drive tower comprises a forward, an intermediate, and a rearward wheel, with a track extending around the three wheels. Only the forward wheel is driven by a linear water motor, which alternately extends and retracts a strut which in turn drives a ratchet arrangement on the front wheel; the drive mechanism thus resembles that of the Balaam '783 U.S. patent, discussed further above. As in the other devices known to the present inventor and discussed above, the Machinery Specialties system has a rigid, unitary frame precluding any movement of the wheels relative to one another for more effective travel over uneven terrain, as provided by the present invention.

Australian Patent Publication No. 291,021 published on Jul. 13, 1967 to Machinery Specialties Pty. Limited, titled "Mobile Irrigation Sprayer," describes a modification of the sprayer device of the Australian '737 Patent Publication noted immediately above. The '021 Australian Publication describes a similar track assembly, but the '021 assembly includes a pair of idler wheels disposed between the front and rear wheels of the track, rather than only a single idler wheel. Moreover, the '021 assembly is driven by a conventional electric motor, rather than a linear hydraulic strut motor. Many of the same problems noted further above are evident in the device of the '021 Australian Publication, e.g. the axially extending motor and gearbox which increase the width of crop damage area as the track passes through the crops, and the rigid frame precluding any relative suspension movement between track wheels.

Finally, Australian Patent Publication No. 293,781 published on Jul. 13, 1967 to Machinery Specialties Pty. Limited, titled "Mobile Irrigation Sprayer," describes a tracked apparatus having only single forward and rearward wheels within a track. Drive is provided by a hydraulic (water) cylinder motor, driving a ratchet mechanism to the rear wheel. The frame is a rigid, unitary construction, precluding any relative suspension movement of the wheels. The apparatus of the '781 Australian Patent Publication is thus more closely related to the device of the '737 Australian Publication to the same applicant, than to the present invention.

None of the above inventions and patents, either singly or in combination, is seen to describe the instant invention as claimed.

SUMMARY OF THE INVENTION

The present invention is a track drive apparatus particularly configured for use in driving a center pivot (circular) or linear movement mobile irrigation system. The present track drive provides numerous benefits over earlier systems of the related art, by combining a relatively narrow track and other structure to reduce crop damage with a relatively long track to provide the desired low pressure footprint for the device, to reduce rut formation and other field damage.

The present track drive includes a single central drive wheel with opposed first and second end guide wheels which guide the track around the ends of the machine. The central drive wheel has a considerably larger diameter than the two end guide wheels, thus bearing against the track along both its upper and lower peripheral areas to provide positive drive to the track at all times. The present mechanism is also articulated, to allow the two end guide wheels to move upwardly and downwardly independently of one another and relative to the central drive wheel. This allows the track drive to ride smoothly over uneven contours in the field, avoiding or at least greatly reducing any rocking action over ridges or bridging of depressions, which would tend to place the entire weight supported by the track on either one or two relatively short areas of track and reduce traction accordingly.

The track itself, as well as the associated componentry, is relatively narrow, in order to avoid lateral damage to crops to either side of the tower insofar as possible. The narrow span of the track is accomplished by providing a dished center to the central drive wheel, and placing the motor and gearbox entirely within this dished center. Thus, the motor and gearbox do not extend laterally from the remainder of the structure, as is the case with most other track configurations.

Accordingly, it is a principal object of the invention to provide a track drive for a mobile irrigation system, for use with both circular and linear movement irrigation systems for reducing crop and field damage where used.

It is another object of the invention to provide such a track drive having a single central drive wheel with opposed first and second end guide wheels, with the single central drive wheel having a diameter larger than the guide wheels for contacting both the upper and lower sides of the track surrounding the wheels simultaneously.

It is a further object of the invention to provide such track drive wherein the track and associated structure is relatively narrow to reduce lateral damage to crops as the track passes therethrough, with the single drive motor and gearbox being installed within the deeply dished center of the drive wheel and contained completely therein.

Still another object of the invention is to provide such a track drive wherein each of the wheels is independently suspended relative to the other wheels, thereby allowing the track to conform to ridges and depressions in the underlying surface and reducing bridging of depressions and rocking over ridges in the field.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a mobile track drive mechanism for supporting an irrigation pipe in a mobile irrigation system, such as used in irrigating very large cultivated areas. Such irrigation systems may comprise either a circular system, in which a long irrigation pipe is suspended over the field by one or more such mobile drive mechanisms and is carried in a circular path about a central origin, or may comprise an irrigation pipe which is carried linearly over the field by two or more such mobile drive systems. The present track drive system may be applied to either of the above types of irrigation systems, and provides numerous novel features and advantages over earlier devices of the related art.

Figure 1:
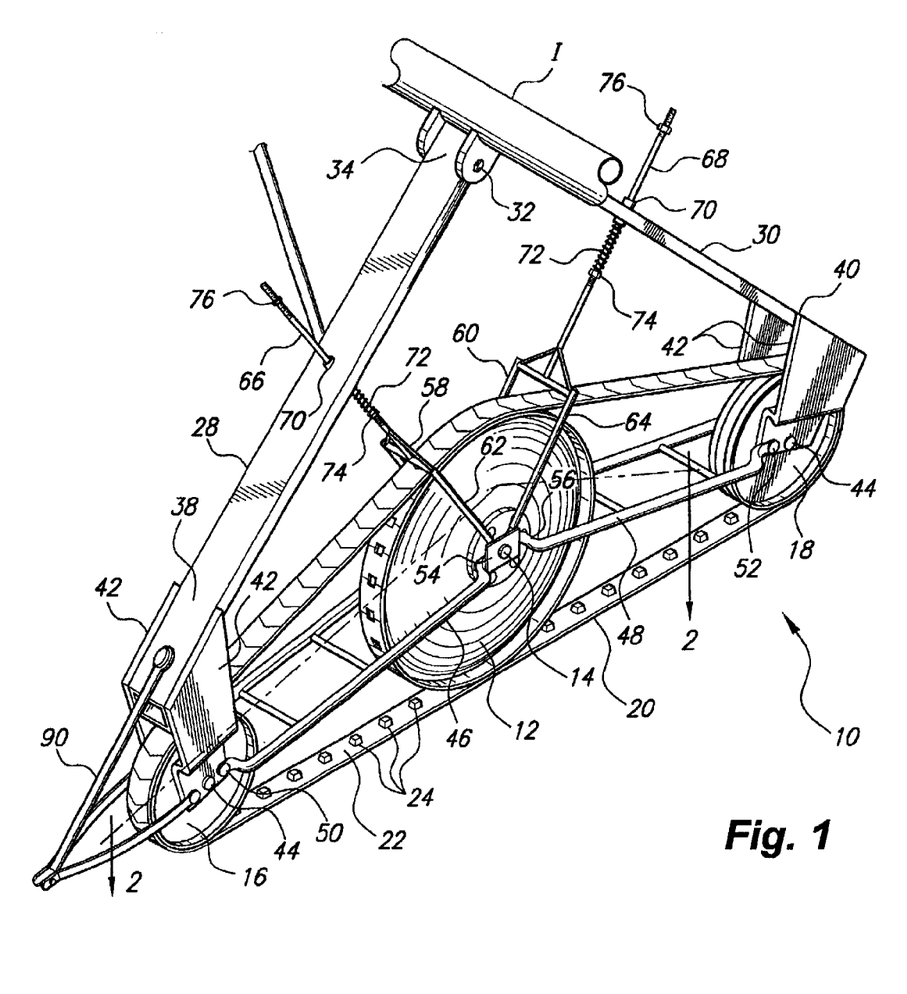
FIG. 1 is a perspective view of a first embodiment of a track drive for a mobile irrigation system according to the present invention, showing its various features.

FIG. 1 provides a general, overall view of the present track drive system, designated by the reference numeral 10, and supporting an irrigation pipe I. The present track drive system 10 is based upon a single, centrally disposed drive wheel 12 which includes an axle 14 driven by motor means (illustrated in FIG. 2, and discussed in detail further below). A first and a second guide wheel, respectively 16 and 18, are provided to either side of the guide wheel 12 in the longitudinal direction of travel of the track drive 10, and widely spaced from the drive wheel 12 to provide good longitudinal stability for the assembly. The two guide wheels 16 and 18 are referred to as "first" and "second," rather than forward and rearward, as the present track drive system 10 may be operated in either direction as desired.

The central drive wheel 12 has a much larger diameter than the two end guide wheels 16 and 18, in order to provide continuous peripheral contact of the drive wheel 12 with the endless drive track 20 which extends in close contact around the two end guide wheels 16 and 18 and the drive wheel 12. The present track drive 10 incorporates an articulating frame structure in order to provide a spring biased suspension for compliance of the track 20 with an uneven underlying surface (ruts, ridges, furrows, etc.). The provision of a single central drive wheel 12 having a considerably larger diameter than the two outlying end guide wheels 16 and 18, assures that the track inner surface 22 remains in continuous tangential contact with the upper and lower periphery of the central drive wheel 12 at all times, regardless of its upward or downward deflection relative to the two end wheels 16 and 18. The track 20 is driven by the drive wheel 12 by a series of inwardly disposed lugs 24 along the track 20, which engage equally spaced track engagement passages 26 in the central drive wheel 12 rim.

The above wheel 12, 16, and 18 and track 20 components are supported by an articulating frame, formed of a series of members pivotally connected to one another and to wheels 12, 16, and 18. First and second upper frame members 28 and 30 extend generally radially outwardly and downwardly from the pipe I. The first upper frame member 28 is secured to the pipe I by a pivot pin 32 through its pipe attachment end 34, while the pipe attachment end 36 (shown in FIGS. 3 and 4) of the second upper member 30 may be rigidly and conventionally affixed (bolted, welded, etc.) to the pipe I.

Each of the two upper frame members 28 and 30 has a lower outboard guide wheel attachment end, respectively 38 and 40, with a pair of spaced apart plates 42 depending therefrom. These plates 42 provide for the rotational attachment of the end guide wheels 16 and 18 to the upper frame members 28 and 30, by means of axles 44.

Figure 3:
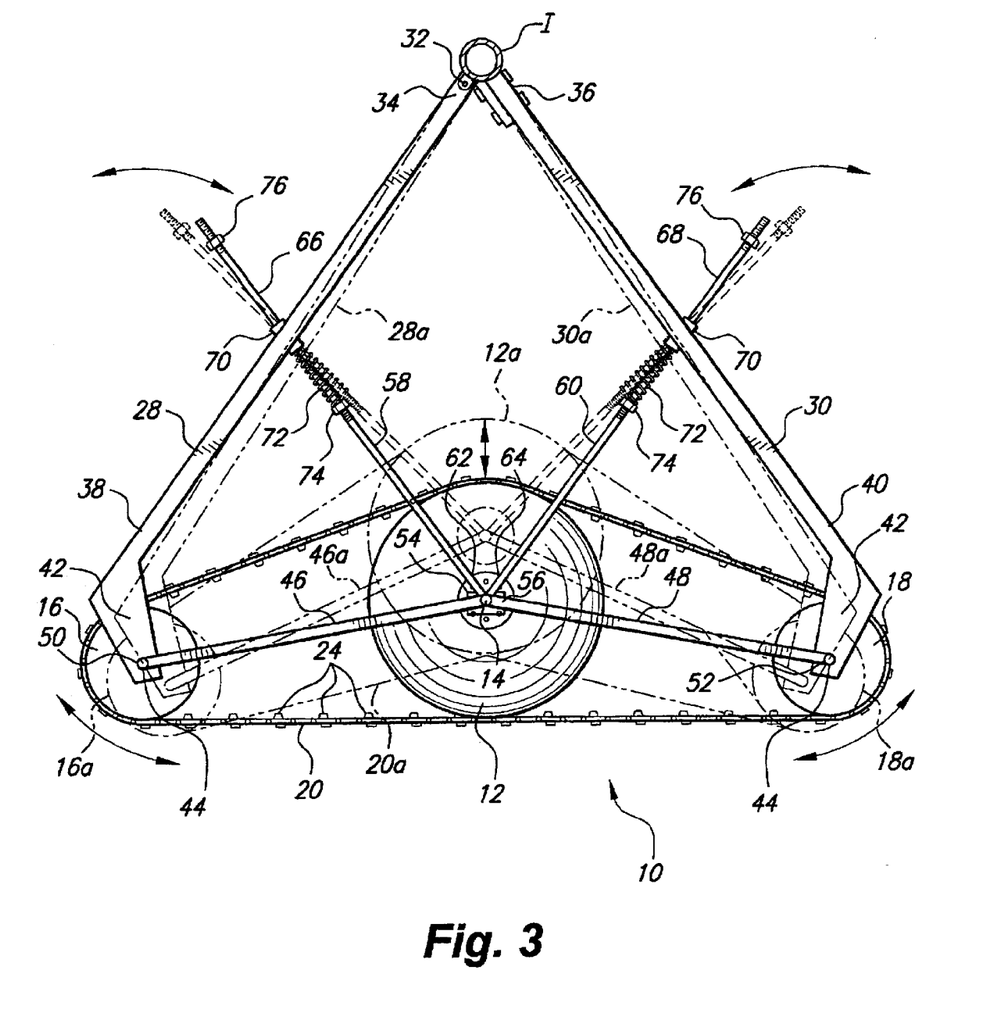
FIG. 3 is a schematic side elevation view of the present track drive, showing the positioning of the wheels and suspension on a level surface in solid lines and further showing the upward deflection of the central wheel in broken lines.
Figure 4:
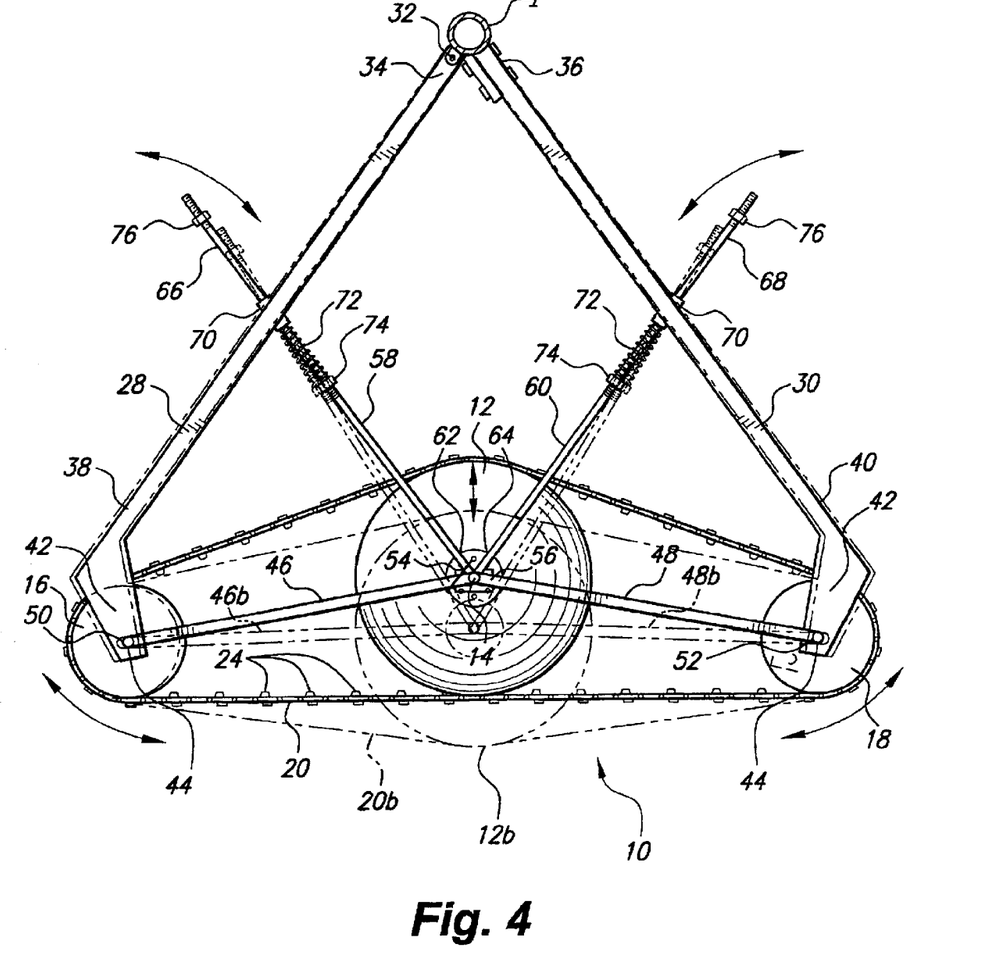
FIG. 4 is a schematic side elevation view similar to the view of FIG. 3, but illustrating the downward deflection of the central wheel in broken lines.

The guide wheel attachment plates 42 also include attachment points for first and second lower frame members, respectively 46 and 48. Each lower frame member 46 and 48 comprises a pair of arms spaced apart by a series of lateral members, with one arm disposed to each side of the wheels 12, 16, and 18 to straddle the wheels. Each lower member 46 and 48 has a respective guide wheel attachment end 50 and 52, pivotally secured indirectly to the respective guide wheel attachment end 50 and 52 by its attachment to the respective guide wheel plates 44. (FIGS. 3 and 4 are simplified, due to their schematic nature, and show the end guide wheel axles 44 and lower frame member attachment ends 50 and 52 as being coincident.)

Each lower frame member 46 and 48 also includes a drive wheel attachment end, respectively 54 and 56. The first lower frame member drive wheel attachment 54 comprises a relatively large plate, to provide for the attachment of the second lower frame member drive wheel end 56 thereto. The drive wheel attachment end plate 54 is rigidly affixed (welded, etc.) to the first lower frame member 46 to preclude relative movement, with the second lower frame member drive wheel attachment end 56 being pivotally attached to the first lower frame member drive wheel attachment plate 54. The plate 54 is rotationally attached to the drive wheel axle 12.

First and second suspension arms, respectively 58 and 60, have bifurcated drive wheel attachment ends, respectively 62 and 64, which attach pivotally to the drive wheel 12 by means of the drive wheel attachment plate 54 of the first lower frame member arm 46. (The opposite attachment ends from those shown in FIG. 1 attach pivotally to the reduction drive gearbox or to a plate attached thereto, generally as shown in the alternate embodiment of FIG. 5 of the drawings.)

These suspension arms 58 and 60 each have an opposite upper frame member attachment end, respectively 66 and 68, comprising a single threaded rod which passes generally medially through a bushing or passage 70 formed through the respective upper frame member 28 and 30. A coil spring 72 is provided concentric with each of the upper attachment ends 66 and 68 of the two suspension arms 58 and 60, with an adjustment nut 74 installed on each upper end 66 and 68 of the two suspension arms 58 and 60 below the springs 72. A stop nut 76 is installed on each suspension arm upper end 66 and 68 to the opposite sides of the upper frame members 28 and 30 from the compression springs 72. These springs 72 tend to urge the drive wheel 12 downwardly relative to the two upper frame members 28 and 30, simultaneously spreading the upper frame members 28 and 30, which along with the weight of the irrigation pipe I and track drive structure 10, tends to spread the upper and lower members 28, 30, 46, and 48 to provide good tension on the drive track 20 and a resilient ride over uneven terrain.

The adjustable spring retainer nuts 74 and stop nuts 76 provide for the adjustment of the pressure and operating range of the suspension of the present track drive 10. If the spring retainer nuts 74 are tightened (i.e., adjusted toward their respective upper frame members 28 and 30), the springs 72 are compressed, thereby producing a greater load on the central drive wheel 12 and resisting articulation as the mechanism 10 encounters uneven terrain. Such relatively tight or close adjustment would normally be used in relatively level fields, without excessive ruts, furrows, ridges, etc. On the other hand, loosening the spring retainer nuts 74 reduces pressure on the central drive wheel 12. This setting would be preferable when operating the present track drive 10 over relatively uneven terrain. The two stop nuts 76 do not affect suspension actuation, other than limiting the extension of the two upper ends 66 and 68 of the suspension members 58 and 60, to prevent their unseating from their respective bushings 70 in the upper frame members 28 and 30.

FIGS. 3 and 4 provide somewhat schematic side elevation views illustrating the articulation of the present track drive when encountering uneven terrain. In FIG. 3, the central drive wheel 12 is deflected upwardly to a deflected position 12a, shown in broken lines. This draws the two end guide wheels 16 and 18 inwardly to the positions 16a and 18a shown in broken lines, due to the fixed length of the endless drive track 20. The lower portion of the drive track 20 is shown as 20a, with the inwardly deflected upper frame members 28a and 30a shown in broken lines in FIG. 3.

The lifting of the wheel 12 is due to the deflection of the belt 20 as it travels over a rise in the underlying terrain. Thus, the track 20 remains in constant contact with the upper and lower peripheries of the drive wheel 12 to provide positive drive for the track 20 at all times. The raising of the central drive wheel 12 relative to the two end guide wheels 16 and 18 deflects the drive wheel attachment ends 54 and 56 of the two lower frame members 46 and 48 upwardly, which also draws their guide wheel attachment ends 50 and 52 inwardly a corresponding amount to that produced by the track 20 deflection described above. The deflected lower arms 46 and 48 are shown in broken lines as arms 46a and 48a in FIG. 3.

The upward deflection of the lower arms 46 and 48 toward their respective upper arms 28 and 30, results in the compression of the suspension springs 72 and extension of the upper ends 66 and 68 of the two suspension arms 58 and 60 through their respective bushings 70 in the two upper frame members 28 and 30. The springs resist the upward deflection of the central drive wheel 12 as described further above, and urge the entire wheel assembly back toward a level position as illustrated in solid lines in FIGS. 3 and 4.

The geometry of the two suspension arms 58 and 60 relative to the two upper frame members 28 and 30 results in an angular deflection of the two suspension arms 58 and 60 through their bushings 70 as the structure articulates over uneven terrain. Hence, the bushings may be slotted in the plane of the length of the upper members 28 and 30, to preclude any bending stresses on the upper ends 66 and 68 of the two suspension arms 58 and 60.

FIG. 4 illustrates the geometry of the present track drive 10 when the central drive wheel 12 encounters a depression (or the equivalent, where the lead end guide wheel encounters a rise). In this case, the drive wheel 12 is forced downwardly to a position 12b, relative to the two end guide wheels 16 and 18. The lower portion of the track 20 is correspondingly deflected downwardly, to a position 20b wrapping about the lower periphery of the downwardly deflected wheel 12b. The stop nuts 76 on the suspension arm upper ends 66 and 68 limit the downward travel of the suspension arms 58 and 60, thus limiting the downward travel of the central drive wheel 12 to ensure that the upper and lower peripheries of the drive wheel 12 remain in constant contact with the drive track 20.

As the downward angular deflection of the two lower frame members 46b and 48b is about the same as the upward angular deflection of those two arms 46 and 48 when the lower peripheries of all the wheels 12, 16, and 18 are level, the distance between the guide end wheels 16 and 18 remains about the same. Thus, little or no relative angular displacement of the two upper frame members 28 and 30 is present once the downward drive wheel 12 deflection has stabilized as shown by the wheel 12b in FIG. 4.

The downward deflection of the wheel 12 as shown in FIG. 4, will also tend to withdraw the upper ends 66 and 68 of the two suspension arms 58 and 60 from their respective bushings 70 in the two upper frame members 28 and 30. The adjustable upper stop nuts 76 limit suspension travel and prevent complete withdrawal of the suspension arm upper ends 66 and 68 from their bushings 70.

Figure 2:
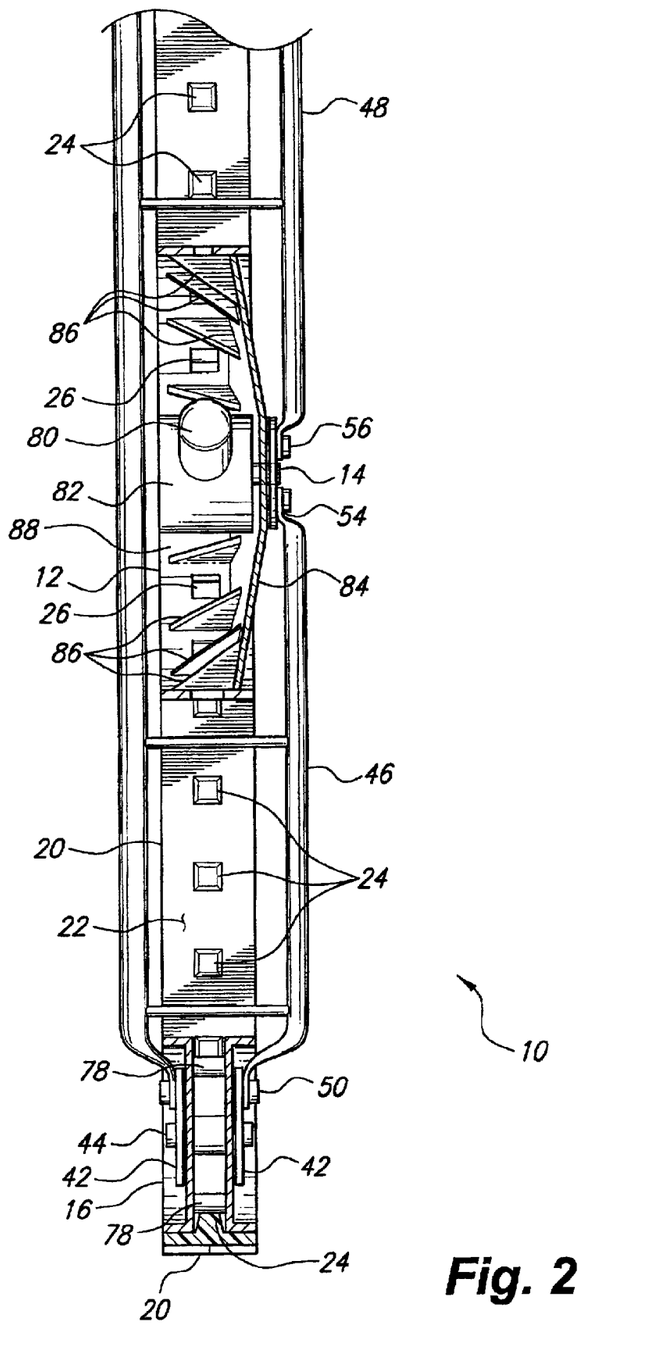
FIG. 2 is a top plan view in section of the present track drive through line 2—2 of FIG. 1, showing further details.

In addition to the above described suspension system, another major advantage of the present track drive mechanism 10 is its relatively narrow width in comparison to earlier developed devices of the related art. Yet, the elongate track and widespread first and second end wheels 16 and 18 provide a relatively large track bearing area or "footprint" for the machine, thereby greatly reducing the tendency for the device to form ruts and depressions in the underlying surface, particularly in soft or muddy ground. FIG. 2 clearly illustrates the relatively narrow width of the present machine 10, with the drive wheel 12 and first end wheel 16 having a width substantially equal to that of the track 20. (The second end guide wheel 18, not shown in FIG. 2, is identical to the first end guide wheel 16.)

The frame structure is also relatively narrow, as can be seen clearly in FIG. 1 of the drawings. The upper frame members 28 and 30 are preferably only slightly wider (if any) than the two end guide wheels 16 and 18, with the opposed guide wheel attachment plates 42 extending downwardly alongside each guide wheel 16 and 18 to capture the respective guide wheel therebetween. The two end guide wheels 16 and 18 are each formed of an outwardly flanged portion, with the two flanges serving as a bearing or contact surface for the drive track 20. The two flanges are separated by a series of lateral spacers 78, which provide a gap between the two wheel portions for passage of the track lugs 24 therebetween. The guide wheel attachment plates 42 are bent inwardly to conform to the relatively narrow space between each end guide wheel portion.

It will be seen in FIGS. 1 and 2 that the frame members (e.g., lower frame members 46 and 48, shown in FIG. 2) and the two suspension arms 58 and 60 define a frame plane for the present mechanism 10. The drive wheel 12, two end guide wheels 14 and 16, and the track 20, are also coplanar with one another, and define a wheel plane. The placement of the central drive wheel 12, the two end guide wheels 16 and 18, and the track 20 directly coplanar with the frame members 28, 30, 46, and 48 and suspension arms 58 and 60, results in these two planes, i.e., the plane of the frame and the plane defined by the wheels, being coplanar with one another. This greatly reduces bending loads upon the axles of the wheels, as well as other stresses, as the attachment of the frame members to both sides of the wheels obviates any cantilevered elements and thus provides a much stronger and sturdier construction.

The rim of the central drive wheel 12 is also relatively narrow, having a width substantially equal to that of the narrow track 20. However, provision must be made for the drive means (motor 80 and reduction drive gearbox 82) used to provide the motive power for the present track drive 10. Accordingly, the drive wheel 12 is asymmetric, with the central disc portion 84 being offset toward one side (i.e., to the right, in FIG. 2). A series of radially disposed reinforcement braces 86 may be provided to strengthen the drive wheel 12 assembly, as desired. The open construction of one side of the drive wheel, and spacing between the guide wheel flanges, also assists the machine in the dispersal of debris which might otherwise collect in the wheels.

This central portion 84 thus provides a dished out interior 88, which provides sufficient lateral depth for installing the gear reduction drive 82 and motor 80 (electric, fluid powered, etc., as desired) therein, with the gearbox 82 and motor 80 essentially completely seated concentrically within the interior 88 of the wheel 12 with no componentry extending axially outwardly therefrom. This location for the motor 80 and gearbox 82 provides further benefits in terms of providing a narrow structure for the present track drive machine 10. This is critical to the efficiency of such mechanisms, as the narrower the machine, the less damage occurs to crops as the drive passes therethrough during operation. While machines with relatively narrow tracks have been used in the past, they universally used one or two wheels, which produce a small and high pressure "footprint." The present machine's elongate track produces a relatively low pressure "footprint," thus greatly reducing damage to the underlying surface, as noted further above.

Further means for reducing crop damage may be provided by a crop guide 90 extending from the leading end of the machine 10, e.g., the first end guide wheel attachment end 38 of the first upper frame member 28. The crop guide 90 may be applied to either end, or both ends, of the machine 10, as desired, depending upon the direction of travel of the machine. This guide 90 serves to smoothly divide standing crops and gently urge them aside as the first end guide wheel 16 approaches, thus greatly reducing crop runover by the guide wheel 16. Other solid or open shapes and configurations for the crop guide 90 may be provided as desired.

Figure 5:
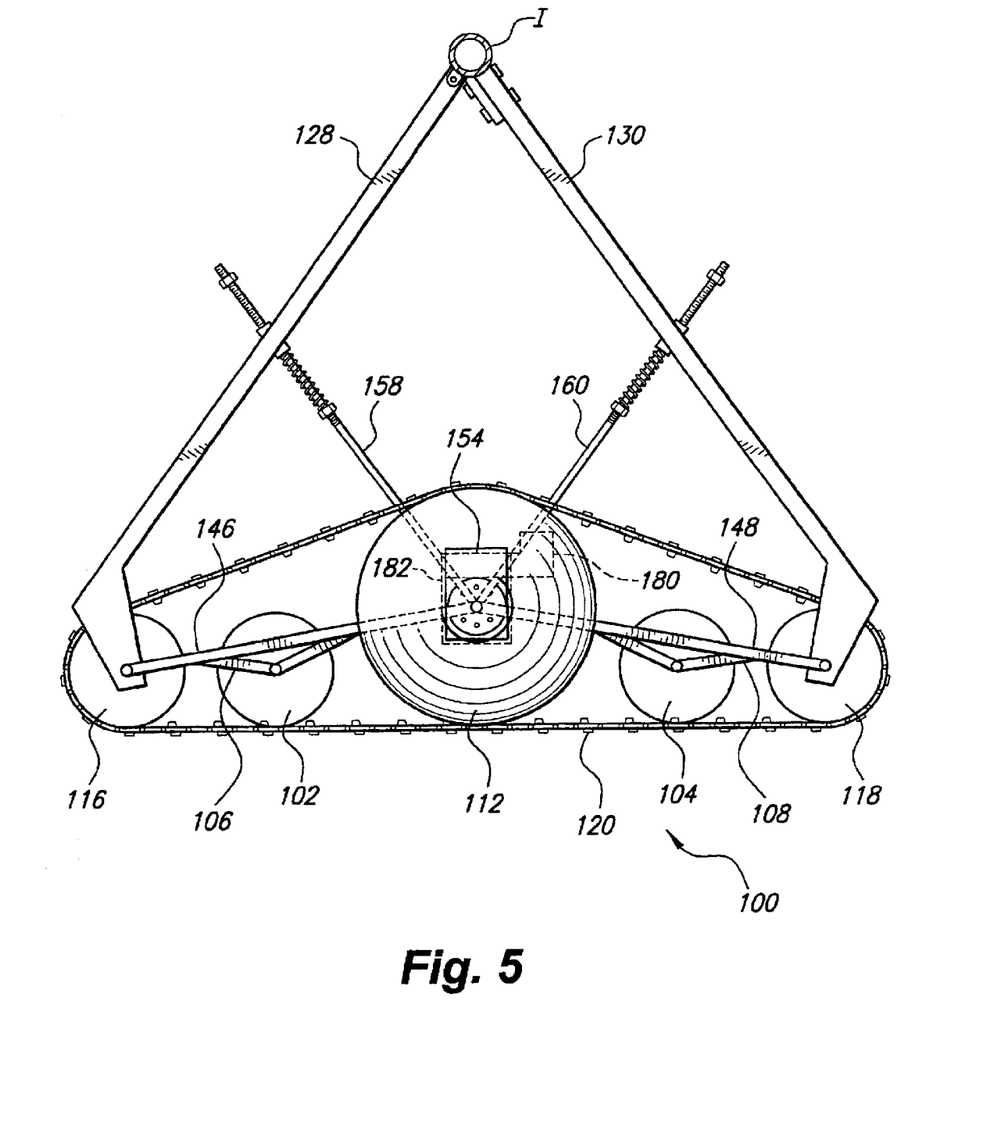
FIG. 5 is a schematic side elevation view of a second embodiment of the present track drive with additional idler wheels.

FIGS. 1 through 4 clearly illustrate the wide spacing between the central drive wheel 12 and the two outlying end guide wheels 16 and 18. This space provides sufficient room for additional idler wheels, if so desired, to provide additional wheel bearing surface against the inner surface of the track. FIG. 5 provides a side elevation view of a track drive embodiment 100, equipped with such intermediate idler wheels 102 and 104 between the central drive wheel 112 and the two outlying end guide wheels 116 and 118. The idler wheels 102 and 104 are carried upon depending lower subframe members 106 and 108 (with the configuration being laterally symmetrical, as noted above for the first embodiment frame), in order to place the lower peripheries of the idler wheels 102 and 104 in the same plane as the other wheels of the device. Reference numerals for the various components of the embodiment 100 of FIG. 5 are one hundred higher than corresponding components of the embodiment 10 of FIGS. 1 through 4, e.g., first and second upper frame members 128 and 130 of the embodiment 100 of FIG. 5 correspond to first and second frame members 28 and 30 of FIGS. 1 through 4, etc.

In conclusion, the present track drive for mobile irrigation systems provides a significant advance over earlier devices of the related art, by providing a much gentler "ride" over the underlying surface. The suspension system of the present machine greatly reduces any tendency for the track to "rock" over higher ridges or "bridge" low areas and furrows. The suspension places more of the track area upon the underlying surface at all times, thus greatly reducing the chances of the present track drive becoming stuck or mired in the field, particularly in soft conditions.

Figure 6:
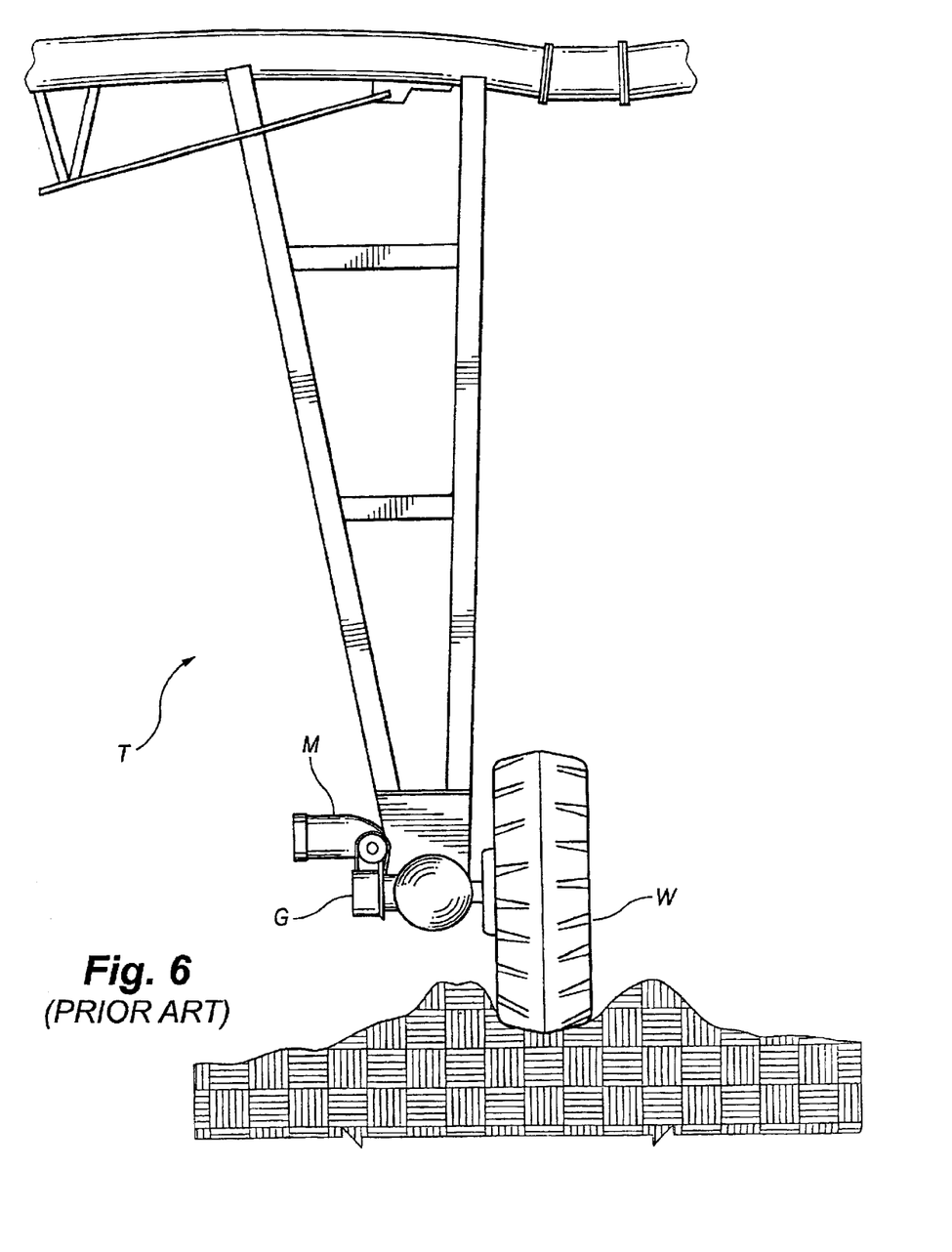
FIG. 6 is a prior art drawing, illustrating the damage done to a field by conventional pipe supports with tire drive systems.

A further advantage of the present machine is easily noted when the machine of FIGS. 1 through 5 is compared to the prior art irrigation pipe tower T of FIG. 6. Such prior art devices generally use forwardly and rearwardly disposed wheel W in tandem, in an attempt to avoid an excessively wide track and crop damage. However, only two wheels W rolling over the underlying surface, results in a relatively high local pressure beneath each wheel and tire W, producing ruts and other damage to the underlying surface, as shown in FIG. 6.

Moreover, crop damage is not greatly reduced by such prior art towers T, particularly in high crops (corn, etc.), due to the axially offset, cantilevered attachment of the wheel W to the base of the tower T and the motor M and gear reduction box G extending axially from the base of the tower T and wheel W axle. This relatively low, laterally spread structure breaks down a relatively wide swath of crops, which along with the field damage produced by the high contact pressure of the wheels and tires W, results in considerable cost to the farmer. The present track drive in its various embodiments obviates all of the above problems, and further provides a much sturdier and more robust machine which will provide years of economical service to the farmer.

It is to be understood that the present invention is not limited to the embodiments described above, but encompasses any and all embodiments within the scope of the following claims.

I claim:

1. A track drive for supporting an irrigation pipe of a mobile irrigation system, comprising:

a single, centrally disposed drive wheel having an axle;

a first and a second end guide wheel, disposed longitudinally to either side of said drive wheel and widely spaced therefrom;

said drive wheel having a diameter larger than each said end guide wheel, a narrow width and a dished interior;

a drive motor and reduction gearbox disposed within said dished interior of said drive wheel and substantially concentric with said drive wheel;

along, narrow endless track extending around said chive wheel and each said end guide wheel and in close contact therewith; and said track having an inner surface in continuous tangential contact with said drive wheel.

2. The track drive according to claim 1, further including:

a first and a second intermediate idler wheel disposed respectively between said first end guide wheel and said drive wheel, and said second end guide wheel and said drive wheel.

3. The track drive according to claim 1, further including:

a first upper frame member having a pipe attachment end pivotally secured to the irrigation pipe, and extending radially downwardly and laterally therefrom;

a second upper frame member having a pipe attachment end secured to the irrigation pipe, and extending radially downwardly and laterally therefrom;

each said upper frame member having a guide wheel attachment end opposite said pipe attachment end;

said first and said second end guide wheel each being rotationally secured to said guide wheel attachment end respectively of said first and said second upper frame member;

a first and a second lower frame member each having a guide wheel attachment end and a drive wheel attachment end;

each said guide wheel attachment end of said first and said second lower frame member being pivotally attached to said guide wheel attachment end respectively of said first and said second upper frame member;

each said drive wheel attachment end of said first and said second lower frame member being pivotally secured to said axle of said drive wheel;

a first and a second suspension arm, each having a bifurcated drive wheel attachment end and an opposite upper frame member attachment end;

said drive wheel attachment end of each said suspension arm being pivotally secured to said axle of said drive wheel;

said upper frame attachment end of each said suspension arm being adjustably secured generally medially respectively to said first and said second upper frame member; and each said upper frame attachment end of each said suspension arm having spring means disposed thereon, urging each said suspension arm and said drive wheel resiliently downwardly and further urging each said end guide wheel apart independently from one another by means of said first and said second lower frame member.

4. The track drive according to claim 3, wherein:

each said upper frame member, each said lower frame member, and each said suspension arm define a frame plane; and each said end guide wheel and said drive wheel define a wheel plane substantially coplanar with said frame plane.

5. The track drive according to claim 1, further including:

a plurality of evenly spaced tugs extending from said inner surface of said track, said drive wheel having a rim including a series of evenly spaced track engagement passages therethrough, drivingly engaging with said lugs of said track for driving said track.

6. The track drive according to claim 1, further including:

crop guide means extending beyond at least one of said first and said second end guide wheels, for smoothly displacing crops with minimal damage and disruption to the crops.

7. A track drive for supporting an irrigation pipe of a mobile irrigation system, comprising:

a single, narrow, centrally disposed drive wheel having an axle;

a first and a second end narrow guide wheel, disposed longitudinally to either side of said drive wheel, widely spaced therefrom and coplanar therewith;

crop guide means extending beyond at least one of said first and said second end guide wheels, for smoothly displacing crops with minimal damage and disruption to the crops;

a long, narrow endless track extending around said drive wheel and each said end guide wheel and in close contact therewith; and a laterally narrow irrigation pipe support tower disposed above each said guide wheel and said drive wheel, supported thereby and disposed substantially coplanar therewith and with said track.

8. The track drive according to claim 7, wherein said irrigation pipe support tower comprises:

a first upper frame member having a pipe attachment end pivotally secured to the irrigation pipe, and extending radially downwardly and laterally therefrom;

a second upper frame member having a pipe attachment end secured to the irrigation pipe, and extending radially downwardly and laterally therefrom;

each said upper frame member having a guide wheel attachment end opposite said pipe attachment end;

said first and said second end guide wheel each being rotationally secured to said guide wheel attachment end respectively of said first and said second upper frame member;

a first and a second lower frame member each having a guide wheel attachment end and a drive wheel attachment end;

each said guide wheel attachment end of said first and said second lower frame member being pivotally attached to said guide wheel attachment end respectively of said first and said second upper frame member;

each said drive wheel attachment end of said first and said second lower frame member being pivotally secured to said axle of said drive wheel;

a first and a second suspension arm, each having a bifurcated drive wheel attachment end and an opposite upper frame member attachment end;

said drive wheel attachment end of each said suspension arm being pivotally secured to said axle of said drive wheel;

said upperframe attachment end of each said suspension arm being adjustably secured generally medially respectively to said first and said second upper frame member; and each said upper frame attachment end of each said suspension arm having spring means disposed thereon, urging each said suspension arm and said drive wheel resiliently downwardly and further urging each said end guide wheel apart independently from one another by means of said first and said second lower frame member.

9. The track drive according to claim 7, further including:

a first and a second intermediate idler wheel disposed respectively between said first end guide wheel and said drive wheel, and said second end guide wheel and said drive wheel.

10. The track drive according to claim 7, wherein said drive wheel has a narrow width and a dished interior, the track drive further comprising:

a drive motor and reduction gearbox disposed within said dished interior of said drive wheel and substantially concentric with said drive wheel.

11. The track drive according to claim 7, further including:

a plurality of evenly spaced lugs extending from said inner surface of said track, said drive wheel having a rim including a series of evenly spaced track engagement passages therethrough, drivingly engaging with said lugs of said track for driving said track.

12. A track drive for supporting an irrigation pipe of a mobile irrigation system, comprising:

a first upper frame member having a pipe attachment end pivotally secured to the irrigation pipe, and extending radially downwardly and laterally therefrom;

a second upper frame member having a pipe attachment end secured to the irrigation pipe, and extending radially downwardly and laterally therefrom;

each said upper frame member having a guide wheel attachment end opposite said pipe attachment end;

a first and a second end guide wheel each being rotationally secured to said guide wheel attachment end respectively of said first and said second upper frame member;

a first and a second lower frame member each having a guide wheel attachment end and a drive wheel attachment end;

each said guide wheel attachment end of said first and said second lower frame member being pivotally attached to said guide wheel attachment end respectively of said first and said second upper frame member;

a single, narrow, centrally disposed drive wheel having an axle; each said drive wheel attachment end of said first and said second lower frame member being pivotally secured to said axle of said drive wheel;

a first and a second suspension arm, each having a bifurcated drive wheel attachment end and an opposite upper frame member attachment end;

said drive wheel attachment end of each said suspension arm being pivotally secured to said axle of said drive wheel;

said upper frame attachment end of each said suspension arm being adjustably secured generally medially respectively to said first and said second upper frame member; and each said upper frame attachment end of each said suspension arm having spring means disposed thereon, urging each said suspension arm and said drive wheel resiliently downwardly and further urging each said end guide wheel apart independently from one another by means of said first and said second lower frame member.

13. The track drive according to claim 12, wherein said drive wheel has a diameter larger than each said end guide wheel, the track drive further comprising:

a long, narrow endless track extending around said drive wheel and each said end guide wheel and in close contact therewith, said track having an inner surface in continuous tangential contact with said drive wheel.

14. The track drive according to claim 12, wherein:

each said upper frame member, each said lower frame member, and each said suspension arm define a frame plane; and each said end guide wheel and said drive wheel define a wheel plane substantially coplanar with said frame plane.

15. The track drive according to claim 12, further including:

a first and a second intermediate idler wheel disposed respectively between said first end guide wheel and said drive wheel, and said second end guide wheel and said drive wheel.

16. The track drive according to claim 12, wherein said drive wheel has a narrow width and a dished interior, the track drive further comprising:

a drive motor and reduction gearbox disposed within said dished interior of said drive wheel and substantially concentric with said drive wheel.

17. The track drive according to claim 12, further including:

a plurality of evenly spaced lugs extending from said inner surface of said track, said drive wheel having a rim including a series of evenly spaced track engagement passages therethrough, drivingly engaging with said lugs of said track for driving said track.

18. The track drive according to claim 12, further including:

crop guide means extending beyond at least one of said first and said second end guide wheels, for smoothly displacing crops with minimal damage and disruption to the crops.

* * * * *